| United States Patent [19] | [11] Patent Number: 4,731,396 |
| --- | --- |
| Auerbach et al. | [45] Date of Patent: * Mar. 15, 1988 |

[54] THERMAL STABILIZATION OF ACETAL POLYMERS

[75] Inventors: Andrew B. Auerbach, Livingston; Thomas C. Yu, Chatham, both of N.J.

[73] Assignee: Celanese Corporation, New York, N.Y.

[*] Notice: The portion of the term of this patent subsequent to Mar. 15, 2005 has been disclaimed.

[21] Appl. No.: 819,092

[22] Filed: Jan. 15, 1986

Related U.S. Application Data

[63] Continuation-in-part of Ser. No. 778,348, Sep. 20, 1985.

[51] Int. Cl.$^4$ .................. C08K 5/34; C08F 283/00
[52] U.S. Cl. ............................. 523/439; 523/461; 523/333; 524/100; 524/101; 524/502; 524/513; 524/512; 524/539; 524/542
[58] Field of Search ................ 523/439, 461, 333; 524/100, 101, 502, 513, 512, 539, 542

[56] References Cited

U.S. PATENT DOCUMENTS

| 2,993,025 | 7/1961 | Alsup et al. | 524/343 |
| --- | --- | --- | --- |
| 3,424,819 | 1/1969 | Green | 524/106 |
| 4,098,843 | 7/1978 | Johnson | 525/183 |
| 4,342,680 | 8/1982 | Sugio et al. | 524/100 |
| 4,351,916 | 9/1982 | Kohan | 524/377 |
| 4,394,468 | 7/1983 | Lu | 524/502 |

Primary Examiner—John Kight
Assistant Examiner—Kriellion Morgan
Attorney, Agent, or Firm—Marvin Turken

[57] ABSTRACT

Stabilized acetal polymer molding compositions are formed by first preparing an intimate dispersion of an amidine stabilizer in a carrier resin comprising an ionic polymer, i.e. an "ionomer", and compounding the dispersion with the acetal polymer. The resulting composition is found in many cases to have improved stability over compositions prepared by adding the amidine compound in an undispersed form.

18 Claims, No Drawings

THERMAL STABILIZATION OF ACETAL POLYMERS

The application is a continuation-in-part of pending application Ser. No. 778,348, filed Sept. 20, 1985.

BACKGROUND OF THE INVENTION

This invention relates to acetal polymers having improved thermal stability.

Molding compositions comprising acetal polymers have been in commercial use for many years. They have application in a wide variety of end uses, e.g. automobile applications such as bumper extensions and instrument panels, plumbing supplies such as valves, shower assemblies, flush tank components, faucets and pipe fittings, tool components such as screw driver adaptors, and household and personal products, such as quick boiling electric water kettles, clothes hangers and combs.

While acetal polymers have a highly favorable spectrum of physical properties which are responsible for their wide commercial acceptance, the unmodified polymer tends to suffer some thermal and oxidative degradation when subjected to elevated temperatures, e.g., over 200° C. Thus various expedients have been proposed for minimizing this problem, including in the product area, the addition of phenolic anti-oxidants as disclosed in U.S. Pat. No. 3,103,499 and 3,240,753 and the addition of amidine compounds alone or in conjunction with amino substituted amides as thermal stabilizers for the polymer as taught by U.S. Pat. No. 3,313,767 and 3,314,918. The stabilizers are generally considered to function as formaldehyde and acid scavengers. Process expedients for the improvement of the thermal properties of the polymer include various types of hydrolysis designed for acetal copolymers containing carbon to carbon bonds in the polymer chain, e.g. oxymethylene-oxyethylene copolymers, as disclosed, for example in U.S. Pat. No. 3,174,948; 3,219,623; 3,318,848; and 3,418,280, and the endcapping of hemiformal groups of oxymethylene homopolymers by acylation or etherification, e.g. as disclosed in U.S. Pat. No. 3,170,896.

Some of the most effective stabilizers used in acetal polymer compositions are amidine compounds. However, although the employment of these stabilizers, particularly in combination with the other expedients set out previously, yields acetal polymer compositions satisfactory for many applications, there exist other applications for which an even greater degree of thermal stability is desirable. Moreover, any expedient having the effect of increasing the efficacy of the stabilizer so that a desired degree of stabilization can be achieved with a reduced amount of stabilizer is considered highly advantageous.

Pending U.S. application Ser. No. 682,878 filed Dec. 18, 1984 by G. Artripe discloses the addition of any of various copolymer salts to acetal polymer compositions for the purpose of improving their thermal stability.

U.S. Pat. No. 3,526,680 of Cherdron discloses the addition of ionic copolymers to acetal polymers in order to improve their impact strength.

U.S. Pat. No. 4,098,843 of Johnson discloses the predispersion of any of certain superpolyamide stabilizers in a carrier resin, which is subsequently admixed with an acetal polymer. The cited patent states that the use of a predispersion of the polyamide has the effect of reducing mold deposits during the molding of the acetal polymer.

U.S. Pat. No. 4,351,916 of Kohan discloses a variation of the process described in U.S. Pat. No. 4,098,843, wherein both the polyamide stabilizer and a poly(ethylene glycol), added to reduce melt viscosity, are predispersed in a carrier resin which is then admixed with the acetal polymer. It is stated by the patentee that in this process, the effect of the predispersion is to reduce the destabilizing effect caused by impurities in the poly(ethylene glycol). The patentee also states that "U.S. Pat. No. 4,098,843 shows no stabilizing advantage over U.S. Pat. No. 2,993,025 and, indeed, carries the implication of larger additive requirements for comparable stability because of the presence of the carrier resin." (column 1, lines 36-40). The second-cited patent in the foregoing quotation, U.S. Pat. No. 2,993,025, contains the original disclosure of the use of polyamides as stabilizers for acetal polymers (polyoxymethylenes).

Pending U.S. application Ser. No. 644,796 filed Oct. 25, 1984, now U.S. Pat. No. 4,582,405 by A. B. Auerbach and K. M. Natarajan discloses a method of reducing black speck formation caused by compounding acetal polymers and polyamides having a melting or softening point below that of the acetal polymer by adding the polyamide to the acetal polymer as a dispersion in a carrier resin.

SUMMARY OF THE INVENTION

In accordance with this invention, an acetal polymer is stabilized with an amidine compound, by first thoroughly dispersing the amidine compound in a carrier resin inert to the acetal polymer and other additives present, said carrier resin comprising an ionic polymer or "ionomer," to form a concentrate or predispersion, and the concentrate is then compounded with the acetal polymer. The carrier resin may contain a non-ionic polymer in addition to the ionomer. The temperature of dispersion is above the melting, sublimation initiation, or softening point of all the materials present including the amidine stabilizer and the components of the carrier resin. The polymer or polymers comprising the carrier resin preferably have melting or softening points below or equal to the melting point of the acetal polymer.

The acetal polymer may be an oxymethylene homopolymer, e.g. a homopolymer of formaldehyde or trioxane, the hemiformal groups of which have been endcapped by acylation or etherification as disclosed, for example in U.S. Pat. No. 3,170,896. Preferably, however, the acetal polymer is an oxymethylene copolymer prepared by copolymerizing trioxane with 0.1 to 15 mole percent of a cyclic ether having at least two adjacent carbon atoms. Copolymers of this type are described in U.S. Pat. No. 3,027,352 of Walling et al. Such copolymers may be described as having at least one chain containing between about 85 and about 99.9 mole percent oxymethylene ($-OCH_2$) units interspersed with between about 0.4 and 15 mole percent of $-O-R-$ units wherein R is a divalent radical containing at least two carbon atoms directly linked to each other and positioned in the chain between the two valences with any substituent in the R radical being inert. The preferred copolymers are those made up of oxymethylene and oxyethylene groups, such as copolymers of trioxane with dioxolane or with ethylene oxide.

Also contemplated as the acetal polymer are terpolymers prepared, for example, by reacting trioxane and a cyclic ether and/or cyclic acetal such as in the preparation of the oxymethylene copolymer, with a third monomer which is a bifunctional compound such as ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,1-propane-diol, cyclohexane-1, 4-diol and 2-dimethyl-4-dimethyl-cyclobutane-1,3-diol, with butanediol diglycidyl ethers being most preferred. The bifunctional compound may be used for example in the range of 0.1 to 10 percent based on the weight of the total monomers. The terpolymer may be prepared using the safe methods known in the art for preparing the copolymers, including the variations for terpolymers disclosed, for example in previously cited U.S. application Ser. No. 644,796, the entire disclosure of which is incorporated by reference.

High molecular weight acetal polymers may be prepared in high yields and with rapid reaction rates by the use of catalysts comprising boron fluoride coordinate compounds in which oxygen or sulfur is the donor atom, as described in U.S. Pat. No. 2,986,506 of Hudgin et al.

When an oxymethylene copolymer is employed containing carbon-to-carbon bonds in the polymer chain, it is preferable to prestabilize the polymer by subjecting it to a melt hydrolysis as disclosed in U.S. Pat. No. 3,318,848 of Clark and U.S. Pat. No. 3,418,280 of Ogden or solution hydrolysis as disclosed in U.S. Pat. Nos. 3,174,948 and 3,219,623.

Any of a wide variety of amidine stabilizers may be employed in the practice of this invention. Suitable amidine compounds include the cyano-guanidine compounds such as cyanoguanidine itself and other compounds containing the divalent 1-cyano-3,3 guanidine radical such as 1-cyano-3-methyl guanidine, 1-cyano-3-ethyl guanidine, 1-cyano-3-isopropyl guanidine, 1 cyano-3,3-diphenyl guanidine, 1-cyano-3-hydroxymethyl guanidine, 1-cyano-3-dodecyl guanidine, 1-cyano-3 (2-hydroxyethyl) guanidine, 1-cyano-3-(2-bromoethyl) guanidine, 1-cyano-3-(m-chlorophenyl) guanidine and 1-3-dicyanoguanidine.

Amine substituted triazines constitute another suitable class of amidine compounds.

The preferred compounds of this class are amine substituted derivatives of symmetrical triazines, including guanamines (2,4-diamino-sym.-triazines), melamine (2,4,6-triamino-sym.-triazine), and substituted melamines. The amino groups may be primary, secondary, or tertiary and other substituents such as hydroxyl substituents may be present. Of course, the amino groups and other substituents must be those which are inert, i.e., will not induce undesirable reactions. Among the specific compounds which are suitable are 2,4-diamino-6-phenyl-sym.-triazine; (benzoguanamine); 2,4-diamino-6-methyl-sym.-triazine; 2,4-diamino-6-butyl-sym.-triazine; 2,4,-diamino-6-benzyloxy sym triazine; 2,4,-diamino-6-butoxy-sym.-triazine 2-,4-diamino-6-cyclohexyloxy-sym.-triazine; 2,4-diamino-6-chloro-sym.-triazine; 2,4-diamino-6-mercapto-sym.-triazine; 2,4-dihydroxy-6-amino-sym.-triazine (ammelide); 2-hydroxy 4,6-diamino sym. triazine (ammeline); N,N,N'N'-tetracyanoethyl benzoguanamine; 2,4,6-triamino sym.-triazine (melamine); phenyl melamine; butyl melamine; N,N-diethyl melamine; N,N-di-(2 hydroxyethyl) melamine; N,N-diphenyl melamine; N,N-diallyl melamine; N,N'N''-trimethyl melamine; N,N'N''-triethyl melamine; N,N'N''-tri(n-propyl)melamine; N,N'N''-tri-(n-butyl) melamine; N,N'N''-tetramethyl melamine; trimethylol melamine; N,N',N''triphenyl melamine; and N,N'N''-trimethylolmelamine.

Other suitable amidine compounds are disclosed, for example, in U.S. Pat. No. 3,313,767.

The amount of amidine stabilizer used will vary depending upon the particular acetal polymer used and the degree of stability desired. Generally, the amount of amidine stabilizer used is from about 0.01 to about 10.0 weight percent, based on the weight of the acetal polymer, preferably from about 0.01 to about 1.0 weight percent, and most preferably from about 0.1 to about 0.5 weight percent, for example, about 0.25 weight percent.

The particular polymeric component or components of the carrier resin into which the amidine stabilizer is dispersed generally melt or soften at or below about 160° C. and preferably at or below the melting or softening point or temperatures of the acetal polymer and are inert to such polymer as well as to the other additives present, that is, the components of the carrier resin are those which do not significantly affect in an adverse manner the properties of the acetal polymer composition with which is is to be admixed. For satisfactory preparation of the amidine-carrier resin dispersion and its subsequent use in the acetal polymer, the components of the carrier resin should have decomposition temperatures higher than the temperatures used during the acetal polymer compounding and molding operations and higher than the temperatures used during the formation of the amidine-carrier resin dispersion.

Within these guidelines, a wide variety of specific ionomers, and, if desired, non-ionic polymers can be used, as will be evident to those skilled in the art. A preferred class of ionomers are copolymers of alpha-olefins containing, for example 2 to 10, preferably 2 to 6 carbon atoms with from about 0.2 to 50, preferably about 3 to 30 mol % of an alpha, beta ethylenically unsaturated carboxylic acid, in which about 10 to 90% of the carboxyl groups are neutralized with cations having a valence of 1 to 3. Preferably the neutralizing cations are metals from Groups IA, IIA and IIIA, and the transition elements of the Periodic Table, e.g. transition elements such as zinc, alkaline earth metals such as calcium and magnesium and alkali metals such as sodium and potassium. The ionomer suitably may have a molecular weight within a wide range as indicated, for example by a number average molecular weight of about 500 to about 500,000 or a melt index of about 0.1 to 1000 g/10 min as determined by ASTM-D-1238.

Suitable alpha-olefins which may be used in the preparation of the contemplated ionomers are ethylene, propylene, butene-1, pentene-1, hexene-1, heptene-1, 3-methylbutene-1, and 4-methylbutene-1. The preferred alpha-olefine is ethylene.

The alpha, beta,-ethylenically unsaturated carboxylic acids which can be copolymerized with the alpha-olefin preferably have 3 to 8 carbon atoms. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

Although the olefin content cf the copolymer should be at least 50 mol percent, more than one olefin can be employed to provide the hydrocarbon nature of the copolymer, also more than one alpha, beta ethylenically unsaturated carboxylic acid may be employed. Additionally, any third copolymerizable monomer can be employed in combination with the olefin and the carboxylic acid comonomer. Preferred termonomers are vinyl esters and acrylates, e.g. vinyl alkanoates and alkyl acrylates and methacrylates having up to eight carbon atoms, such as vinyl acetate, vinyl propionate, methyl methacrylate, ethyl acrylate and isobutyl acrylate.

Ionomers which may be used in the practice of the invention are those of relatively high molecular weight e.g. those having a melt index of about 0.1 to 1000 g./10 min. as disclosed for example in U.S. Pat. Nos. 3,264,272 and 3,404,134, and/or those having a weight average molecular weight of above 5000 and up to one million as disclosed in U.S. Pat. No. 3,526,680; and those of relatively lower molecular weight, e.g. a number average molecular weight of about 500 to 20,000 such as those disclosed in U.S. Pat. Nos. 4,381,376 and 4,412,040 and pending U.S. application Ser. No. 682,878, filed Dec. 18, 1984. The entire disclosures of the foregoing references are incorporated herein by reference. Some suitable commercial ionomers are those sold by DuPont Company under the trademark "Surlyn," those sold by Dow Chemical Co. as "Dow Ionomer Resin SI 8292903 and those sold by Allied Chemical Corp. under the trademark "AC 201 A."

If it is desired to utilize a non-ionic polymer as part of the carrier resin in addition to the ionomer, a preferred class of such non-ionic polymers includes, for example, polyethylene and copolymers of ethylene with methyl acrylate, ethyl acrylate, vinyl acetate, acrylonitrile, carbon monoxide, or methyl methacrylate, and especially ethylene-ethyl acrylate copolymers containing from about 10 to 30 weight percent ethyl acrylate and having a melt index of from about 0.5 to 100, and preferably from about 1 to 20. Still other materials which can be used as the non-ionic polymer in the carrier resin include methacrylate and acrylate copolymers, such as polymethyl methacrylate containing about from 4 to 15 percent ethyl acrylate, copolyesters, polyether-esters, polystyrene, styrene-acrylonitrile copolymers, polyethylene oxide, polyether homo and copolymers and mixtures of two or more of the above polymers.

Particularly preferred non-ionic polymers are copolymers of ethylene with ethyl acrylate or vinyl acetate such as those commercially available from Union Carbide under the designation BAKELITE ® Ethylene Copolymer BPD-6169 Natural which is a copolymer of ethylene and 18% ethyl acrylate having a typical melt index of 6 g/10 min. (ASTM D 1238) a typical density of 0.931 g/cm$^3$ (ASTM D 1505) and a typical Vicat softening point of 64° C. (ASTM D 1525); DPDA-6182 Natural which is a copolymer of ethylene and 15% ethyl. acrylate having a typical melt index of 1.5 g/10 min., a typical density of 0.930 g/cm$^3$ and a typical Vicat softening point of 66° C.; and DQDA-6479 Natural 7 which is a copolymer of ethylene and 10 weight percent of vinyl acetate based on the weight of the copolymer, having a typical melt index of 1.9 g/10 min and a typical density of 0.930 g/cm$^3$. The most preferred carrier resin is DPDA-6182 Natural, which has a softening temperature range of about 110° C. to about 120° C. Mixtures of any of the foregoing ionomers, and if utilized, of the non-ionic polymers, are also contemplated as part of the carrier resin. It is preferred that the carrier resin polymers are linear rather than cross-linked.

In the preparation of the instant dispersions, the amidine stabilizer and the carrier resin are first blended at a temperature above the melting or softening temperatures of the components of the carrier resin and above the melting or sublimation initiation temperature of the amidine stabilizer. These components are generally blended in a high shear mixing device of the type known in the art, to disperse the amidine stabilizer in the carrier resin as fine particles.

The amidine-carrier resin dispersion should in most cases contain less than about 50 weight percent of the amidine stabilizer, preferably from about 12 to about 40 weight percent, with all or substantially all the remainder being the carrier resin. As stated the carrier resin may be composed entirely of at least one ionomer, or the latter may be mixed with about 5 to 95 weight percent, preferably about 20 to 80 weight percent of at least one non-ionic polymer based on the weight of ionomer.

Any convenient apparatus can be used for admixing the carrier resin and the amidine stabilizer typically at a temperature within the range of about 160° C. to about 300° C. The degree of shear in the admixing of the acetal polymer and amidine-carrier resin dispersion whould be high enough to achieve a fairly intimate blend and the effectiveness of any particular mixing procedure may depend on the specific nature of materials being mixed e.g. their compatibility, melt viscosity, particle size, etc. For example, pigmented molding compositions may require a high degree of shear in the preparation of the stabilizer dispersion than non-pigmented molding compositions. In one preferred blending procedure, the amidine stabilizer and carrier resin granules are first dry blended and then melt extruded in a high shear single or twin screw extruder, followed by cutting the extruded strands into pellets. In some instances, the pelletizer strand bath water water should be kept below about 25° C. to about 30° C. in order to adequately cut the strands.

The amidine carrier resin dispersion is admixed with acetal polymer at a temperature above the melting or softening temperatures of the acetal polymer and the polymer components of the carrier resin to obtain as uniform a mixture or intimate blend of the acetal polymer and the amidine-carrier resin dispersion as possible.

In general, the amidine-carrier resin dispersion is used in an amount of from about 0.03 to about 30 wt. %, and preferably from about 0.03 to about 3 wt. %, based on the weight of the acetal polymer.

The molding compositions may suitably be prepared by any conventional compounding or mixing procedure that will result in an intimate blend or mixture of the components. Preferably, dry or melt blending procedures and equipment are used. For example, the amidine carrier resin dispersion can be dry mixed with the acetal polymer (in the form of pellets, chips, granules or powder) typically at room temperature, and the resulting mixture melt blended in any conventional type extrusion equipment, which is heated to a temperature of from about 180° C. to about 230° C., and preferably from about 185° C. to about 205° C. If desired, an inert atmosphere such as a nitrogen blanket or purge may be used during the compounding operation.

The acetal polymer molding conposition resulting from the compounding procedure is then comminuted mechanically, for example, by chopping, pelletizing or grinding, into granules, pellets, chips, flakes or powders.

It is within the ambit of the present invention that the acetal polymer molding composition also include, if desired, plasticizers, other formaldehyde scavengers, mold lubricants, antioxidants, fillers, colorants, particulate or fibrous reinforcing agents, e.g. glass fiber, light stabilizers, pigments, other stabilizers, and the like, so long as such additives do not materially affect the desired properties of the resulting molding composition and the articles molded therefrom. The additional additives can be admixed at any convenient stage in the molding composition preparation, but usually are added when the acetal polymer is being blended or admixed with the stabilizer-carrier resin dispersion.

Other suitable formaldehyde scavengers which may be used in addition to the amidine stabilizer include other amidines in undispersed form such as triazines, polyamides, ureas, hydroxyl salts of calcium, magnesium, and the like, salts of carboxylic acids, and metal oxides and hydroxides.

Suitable mold lubricants include alkylene disstearamide, long-chain amides, waxes, oils, and polyether glycides. The preferred mold lubricant is commercially available from Glyco Chemical, Inc. under the trademark "Acrawax C" and is ethylene bisstearamide.

A suitable class of antioxidants are hindered bisphenols such as 1,6-hexamethylene bis-(3,5-di-t-butyl-4-hydroxyhydrocinnamate), commercially available from Ciba-Geigy Corp. under the trademark "Irganox 259."

Acetal terpolymers may also be added to the molding composition as a nucleant e.g. a terpolymer of 97.95 wt. % of trioxane, 2.0 wt. % of ethylene oxide and 0.05 wt. % of butanediol diglycidyl ether, stabilized by 0.5 percent by weight "Irganox 259" and 0.1 percent by weight of cyanoguanidine added in undispersed form. The composition may be modified by substituting calcium hydroxy stearate for the cyanoguanidine.

The molding compositions of the present invention may be processed in the thermoplastic state, for example, by injection molding or extrusion molding, into shaped articles, for example, bars, rods, plates, sheets, films, ribbons, or tubes and the like. The incorporation of the amidine-carrier resin dispersion in the acetal polymer molding compositions in many cases enhances the thermal stability of the resulting molding composition as well as the resulting molded objects over that obtained by the addition of amidine stabilizer in undispersed form at any specific level of content. Moreover, the addition of the amidine stabilizer in dispersed form also results in a marked improvement in the odor of the molding composition or molded article over that resulting from the addition of the stabilizer in undispersed form.

DESCRIPTION OF SPECIFIC EMBODIMENTS

The following examples further illustrate the invention. All parts and percentages in the examples and the remainder of the specification are by weight of the total composition unless otherwise specified.

Control Examples A to E and Examples 1 to 3

These examples illustrate the beneficial effect on the stability of any acetal polymer of adding a typical amidine stabilizer, viz. benzoguanamine (BZG), to the acetal polymer in the form of a dispersion in a typical ionomer as carrier resin.

Each of the examples employed an acetal copolymer containing oxymethylene and randomly distributed oxyethylene units in the polymer chain, prepared by copolymerizing trioxane and about 2 wt. % of ethylene oxide as disclosed in U.S. Pat. No. 2,986,506. A blend was prepared of 50% of this copolymer melt hydrolyzed as disclosed in U.S. Pat. No. 3,418,280 and 50% of such copolymer solution hydrolyzed as disclosed in U.S. Pat. No. 3,174,948. The resulting acetal polymer had a crystallinity of approximately 75 percent, an inherent viscosity (I.V.) of approximately 1.3 (measured at 60° C. in a 0.1 weight percent solution in p-chlorophenol containing 2 weight percent of alphapinene), a melting temperature of about 165° C., and a melt index of approximately 9.5 g./10 min. when tested in accordance with ASTM method D1238-82.

A dispersion was prepared of 1 part by weight of benzoguanamine (BZG) in 4 parts by weight of an ethylene-methacrylic acid-isobutyl acrylate terpolymer carrier resin containing about 9.0 wt. % of methacrylic acid in which about 50-75% the carboxyl groups are neutralized with zinc ions, and 9.wt. % of isobutyl acrylate. This ionomer has a melt index of 1.0 g/10 min. (ASTM D-1238), a specific gravity of 0.96 (ASTM D-792) and a Vicat softening point of 57° C. (ASTM D-1525-70) and is sold by DuPont Company under the trademark "Surlyn 9020." The BZG and carrier resin were tumbled in a fiberboard barrel for 30 min and the dry mix was then blended in a high shear Brabender extruder operated at a barrel temperature of 230° C., a die temperature also of 230° C., and a speed of 100 rpm. The dispersion was pelletized using a strand bath water of below 29° C. BZG as pure crystals or as the foregoing dispersion (in pellet form) was then intimately blended with the previously discribed acetal copolymer in a ¾" Brabender extruder having a nonvented screw (to maximize the interaction between the BZG and formaldehyde inside the extruder) at a temperature of approximately 180° C. and at a screw speed of 20 rpm (i.e., the longest residence time of polymer inside the extruder). In each instance a further stabilizer package of Irganox 259, Acrawax C and an acetal termpolymer as previously described was added to the extruder so that a final molding composition containing 98.3 percent by weight acetal polymer, 0.5 percent by weight Irganox 259, 0.2 percent by weight Acrawax C, 0.5 percent by weight of the acetal terpolymer and varying amounts of BZG from 0.2 to 0.001 weight percent added as pure crystals or in dispersed form, was obtained, weight percents being based on the total weight of the composition.

As an indication of the thermal stability of each of the various samples, its thermal degradation rate at an elevated temperature, extractable formaldehyde and generated formaldehyde were determined, using the following procedures:

The determination of thermal degradation rate at elevated temperatures (e.g. 230° C., the rate designated as $K_{D230}$) utilized an apparatus consisting of a forced draft oven containing a cylindrical aluminum block, 4 in. high and 14 in. in diameter, as a heat sink. The block was provided with six recesses, ½ in. deep and 2¼ in. in diameter, to accommodate aluminum dishes containing polymer samples. A thermocouple inserted in the block was connected to a recorder-controller system capable of maintaining the block temperature to within ±0.25° C. over the range 200–270° C.

A guided lid, providing 1 in. of space above the samples when resting on the block, was lifted by a pulley and cable arrangement as the oven door was opened and lowered as the door was closed. A ⅛ in. hole drilled into the top surface of the block and out the side, provided a vent for degradation products to displace the air and escape. Thus, there was limited access of air above the sample; in this respect, the environment to which the polymer was subjected tends toward that prevailing in the barrel of a polymer-processing machine, such as an extruder or injection molding apparatus.

The samples were dried at 100° C. and 25 in. of mercury vacuum for three hours. a polymer sample (5 g.) was accurately weighed (to 0.2 mg.) in a disposable aluminum dish, and placed in the block recess. After 45 min. the sample was removed, cooled in a desiccator to room temperature, and weighed. The percent weight loss, divided by 45 min., gave a $K_{d230}$ value which is the average percent weight loss per minute at 230° C. The coefficient of variation for values determined by this method was 4–7%.

For the determination of extractable formaldehyde, (Ext. $CH_2O$) a 100 gram sample of the acetal polymer composition was added to 100 ml of distilled water and refluxed at boiling for 60 minutes. The sample was neutralized with potassium hydroxide (0.10N) solution and the final pH noted. Fifty (50) milliliters of sodium sulfite solution (1.0M) was added to the neutralized solution. This final solution was then titrated with sulfuric acid (0.10N) to the original pH level noted previously. A value for the formaldehyde level was calculated from the following formula:

$$\% \text{ Formaldehyde} = \frac{T_b \times N(H_2SO_4) \times 3.0}{\text{Sample wt. in grams}}$$

$T_b$ = ml of acid
N = normality of $H_2SO_4$

Generated formaldehyde was measured by the following procedure:

The test equipment was a ¾" Brabender extruder connected to a vertical heated (300° F.) column which was continuously swept by a nitrogen purge. The evolved formaldehyde carried in the purge gas has analyzed directly using a gas chromatograph.

The polymer to be evaluated was added to the rear end of the extruder, melted at 390° F. and then extruded through the vertical column. The extrudate was drawn through a cooling bath and then taken up and pelletized by a strand chopper. The formaldehyde/nitrogen purge stream from the column was analyzed for formaldehyde in parts per million (ppm) of polymer at successive intervals and an average was taken of six runs. Peak areas were generally within a ±10% variance.

Volatiles (Vol.) were measured by the following procedure.

Ten grams of sample was accurately weighed, dried in a vacuum oven (25" vacuum) at 100° C. for one hour and cooled in a dessicator for thirty minutes. The sample was then reweighed and the moisture level determined by use of the following formula:

$$\% \text{ Moisture} = \left( \frac{\text{Original wt.} - \text{wt. after drying}}{\text{Sample Wt.}} \right) \times 100$$

The results are shown in Table I. The BZG was added as pure crystals in Control Examples A, B, C and E and as a dispersion in the carrier resin formed in the high shear extruder in Examples 1 to 3. The carrier resin was added without any BZG dispersed in it in Control Examples D and E.

TABLE I

| Example | BZG wt. % | Surlyn 9020 wt. % | $K_d$ %/min | Extractable Formaldehyde % | Generated Formaldehyde, ppm |
|---|---|---|---|---|---|
| A | 0.2 | — | .030 | .021 | 17.5 |
| B | 0.01 | — | .070 | .017 | 13.2 |
| C | 0.001 | — | .100 | .017 | 10.9 |
| D | — | 0.8 | .017 | .011 | 7.8 |
| E | 0.2 | 0.8 | .024 | .014 | 9.2 |
| 1 | 0.2 | 0.8 | .022 | .013 | 6.2 |
| 2 | 0.01 | 0.04 | .054 | .021 | 8.6 |
| 3 | 0.001 | 0.004 | .078 | .010 | 13.7 |

The results of Examples 1 to 3 compared with Control Examples A to C indicates that the use of a dispersion of BZG in an ionomer carrier resin causes a reduction in thermal degradation ($K_d$) extractable formaldehyde and generated formaldehyde as compared to the addition of the same amount of BZG in undispersed form. While control Example D indicates that the Surlyn 9020 carrier resin alone has some effect in reducing these values, a comparison of Example 1 with Control Example E indicates that even when the same amounts of both BZG and ionomeric carrier resin are used, the addition of these materials to the acetal polymer in the form of a dispersion as compared with separate addition of these agents reduces the generated formaldehyde substantially, while slightly reducing the $K_d$ value and extractable formaldehyde.

Control Examples F to L and Examples 4 to 13

These examples illustrate the effect of the use of a dispersion of BZG in an ionomer alone (Surlyn 9020) and in a combination of the ionomer and a non-ionic carrier resin, viz. an ethylene-ethyl acrylate copolymer.

The procedure of the previous examples was followed except that, in addition to the Surlyn 9020 employed in the previous examples, Examples 7 to 13 also utilized as part of the carrier resin a non-ionic polymer which was an ethylene-ethyl acrylate copolymer carrier resin containing 15% of ethyl acrylate and scld by Union Carbide Corporation as "Bakelite Ethylene Copolymer DPDA-6182 Natural" (PEEA). In the latter examples the PEEA was first mixed with the BZG and the resulting mixture further mixed with the Surlyn 9020, using a fiberboard barrel and Brabender extruder as described in the previous examples. Since the type of hydrolysis of the acetal polymer may also effect the stability of end use compositions, these and subsequent examples include the stabilization of melt- or solution-hydrolyzed acetal polymers and blends of the two. The results are shown in Table II wherein "MH Ratio" indicates the ratio of melt-hydrolyzed polymer to the total acetal polymer consisting only of melt- and/or solution-hydrolyzed polymer, used to prepare the composition.

TABLE II

| Example | BZG wt. % | Surlyn 9020 wt. % | PEEA wt. % | MH Ratio | Kd %/Min | Extractable Formaldehyde % | Generated Formaldehyde ppm | Volatiles % |
|---|---|---|---|---|---|---|---|---|
| F | — | 0.8 | — | 0 | .023 | .0060 | 1.71 | .12 |
| G | — | 0.8 | — | .5 | .029 | .015 | 3.40 | .11 |
| H | — | 0.8 | — | 1.0 | .024 | .023 | 5.80 | .19 |
| I | 0.2 | — | — | 0 | .023 | .008 | 4.56 | .14 |
| J | 0.2 | — | — | .5 | .025 | .018 | 10.40 | .13 |
| K | 0.2 | — | — | 1.0 | .024 | .026 | 8.43 | .19 |
| 4 | 0.2 | 0.8 | — | 0 | .017 | .0020 | 1.57 | .09 |
| 5 | 0.2 | 0.8 | — | .5 | .018 | .0080 | 3.61 | .10 |
| 6 | 0.2 | 0.8 | — | 1.0 | .022 | .024 | 6.31 | .14 |
| L | — | 0.2 | — | 1.0 | .021 | .024 | 4.80 | .16 |
| 7 | 0.2 | 0.2 | 0.6 | 0 | .018 | .002 | 1.57 | .08 |
| 8 | 0.2 | 0.2 | 0.6 | .5 | .019 | .008 | 4.12 | .16 |
| 9 | 0.2 | 0.2 | 0.6 | 1.0 | .021 | .025 | 7.00 | .17 |
| 10 | 0.2 | 0.04 | 0.76 | 1 | .025 | .023 | 8.50 | .02 |
| 11 | 0.2 | 0.04 | 0.76 | 0 | .018 | .001 | 1.13 | .06 |
| 12 | 0.2 | 0.1 | 0.7 | 1 | .026 | .020 | 7.11 | .07 |
| 13 | 0.2 | 0.1 | 0.7 | 0 | .015 | .001 | 1.20 | .03 |

A comparison of the results of Examples 4, 5 and 6 with those of Control Examples F to K indicates that in most cases the addition to the acetal polymer of a dispersion of BZG in the ionomer results in better stability of the polymer than that resulting from addition of the BZG or ionomer alone. Moreover a comparison of the results of Examples 7 to 13 with those of Examples 4, 5 and 6 indicates that a substantial proportion, e.g. more than 50% of the Surlyn 9020 as ionomer may be replaced with a less costly non-ionic polymer such as PEEA with little or no sacrifice of end-use stability. This is a surprising result since in general addition of dispersions of BZG in PEEA to acetal polymers do not result in any better stability than the addition of pure BZG crystals.

CONTROL EXAMPLES M AND N AND EXAMPLES 14 to 17

These examples illustrate the use of cyanoguanidine (CNG) as the amidine stabilizer.

The procedure of the previous examples was followed except 0.1 wt. % of CNG based on the weight of the composition was utilized as the amidine compound as a dispersion in the carrier resins or, in the control examples, as pure crystals. The results are shown in Table III:

A comparison of the results of Examples 14 to 17 with those of Control Examples M and N indicates that the addition of CNG to an acetal polymer in the form of a dispersion in an ionomer such as Surlyn 9020 or a combination of a mixture of a minor proportion of the ionomer and a major proportion of a non-ionic polymer such as PEEA, as carrier resin increases the stability of the carrier resin to a greater extent than the addition of pure CNG.

CONTROL EXAMPLES O TO Q AND EXAMPLES 18 to 21

These examples illustrate the use of a magnesium-neutralized carboxylic copolymer as the ionomer present in the ionomer-containing carrier resin.

The procedure of the previous examples was followed except that the ionomer was a copolymer of ethylene and about 10 wt. % of acrylic acid with about 45% of its carboxyl groups neutralized with magnesium and having a melt index of 4 as determined by ASTM D-1238, and sold by Dow Chemical Co. as Dow Ionomer Resin SI 8293903 No. 1 ("Dow Resin No. 1"). The amidine stabilizer was 0.2 wt. % of BZG dispersed in the ionomer-containing carrier which in Examples 20 and 21 also contained PEEA as a non-ionic polymer component. The results are shown in Table IV:

TABLE III

| Example | BZG wt. % | Surlyn 9020 wt. % | PEEA wt. % | MH Ratio | Kd %/Min | Extractable Formaldehyde % | Generated Formaldehyde ppm | Volatiles % |
|---|---|---|---|---|---|---|---|---|
| M | 0.1 | — | — | 1 | .024 | .022 | 14.78 | .07 |
| N | 0.1 | — | — | 0 | .017 | .001 | 5.07 | .04 |
| 14 | 0.1 | 0.4 | — | 1 | .020 | .014 | 6.17 | .05 |
| 15 | 0.1 | 0.4 | — | 0 | .013 | .003 | 3.54 | .06 |
| 16 | 0.1 | 0.05 | 0.35 | 1 | .018 | .021 | 10.40 | .06 |
| 17 | 0.1 | 0.05 | 0.35 | 0 | .014 | .004 | 3.90 | .06 |

TABLE IV

| Example | BZG wt. % | Dow Resin No. 1 wt. % | PEEA wt. % | MH Ratio | Kd %/Min. | Extractable Formaldehyde % | Generated Formaldehyde ppm | Volatiles % |
|---|---|---|---|---|---|---|---|---|
| O | 0.2 | — | — | 1 | .031 | .021 | 9.90 | .01 |
| P | 0.2 | — | — | 0 | .017 | .002 | 4.12 | .06 |
| Q | — | 0.8 | — | 1 | .026 | .001 | 5.73 | .07 |
| 18 | 0.2 | 0.8 | — | 1 | .022 | .018 | 11.86 | .07 |
| 19 | 0.2 | 0.8 | — | 0 | .019 | .002 | 2.01 | .07 |
| 20 | 0.2 | 0.1 | 0.7 | 1 | .020 | .021 | 8.43 | .03 |
| 21 | 0.2 | 0.1 | 0.7 | 0 | .015 | .001 | 2.88 | .05 |

A comparison of the results of Examples 18 and 19 with those of Control Examples O, P and Q indicates that the addition to an acetal polymer of BZG and a magnesium neutralized ionomer results in a greater degree of stability as determined by certain tests than the addition of BZG or ionomer alone. Moreover, the results of Examples 20 and 21 as compared with those of 18 and 19 shows that similar results can be obtained if a major proportion of the ionomer is replaced with a non-ionic carrier resin such as PEEA.

We claim:

1. A method of preparing a stabilized acetal polymer composition comprising forming an intimate dispersion of an amidine stabilizer in a carrier resin comprising an ionomer at a temperature above the softening point of said resin and compounding said dispersion with said acetal polymer, said carrier resin having a melting or softening point no higher than the melting point of the acetal polymer.

2. The method of claim 1 wherein said ionomer is a partially neutralized copolymer of an alpha-olefin and an alpha, beta ethylenically unsaturated carboxylic acid.

3. The method of claim 2 wherein said ionomer is a copolymer of ethylene and acrylic or methacrylic acid in which about 10 to 90% of the carboxyl groups are neutralized with a metal from Group IA, IIA, IIIA or the transition elements of the Periodic Table.

4. The method of claim 3 wherein said metal is zinc, magnesium or calcium.

5. The method of claim 1 wherein said amidine stabilizer is benzoguanamine.

6. The method of claim 1 wherein said carrier resin also contains non-ionic polymer having a melting or softening point no higher than the melting point of the acetal polymer.

7. The method of claim 6 wherein said non-ionic polymer is an ethylene/ethyl acrylate copolymer.

8. The method of claim 1 wherein said dispersion contains up to about 50 weight percent of said stabilizer.

9. The method of claim 8 wherein said dispersion contains from about 12 to 40 weight percent of said stabilizer.

10. of claim 6 wherein said carrier resin comprises about 5 to 90 wt % of ionomer and about 95 to 5 wt % of non-ionic polymer.

11. The method of claim 1 wherein said carrier resin has a melting or soften point no higher than about 160° C.

12. The method of claim 2 wherein said copolymer contains about 0.2 to 50 mol % of said carboxylic acid.

13. The method of claim 10 wherein said carrier resin comprises about 20 to 80 weight percent of at least one non-ionic polymer.

14. A stabilized acetal polymer composition produced by the method of claim 1.

15. A stabilized acetal polymer composition produced by the method of claim 2.

16. A stabilized acetal polymer composition produced by the method of claim 3.

17. A stabilized acetal polymer composition produced by the method of claim 4.

18. A stabilized acetal polymer composition produced by the method of claim 6.

* * * * *